United States Patent [19]
Scott, deceased et al.

[11] 3,841,469
[45] Oct. 15, 1974

[54] METHOD AND APPARATUS FOR CLEANING ROD CONVEYORS

[75] Inventors: Donald C. Scott, deceased, late of Nueces County, Tex.; by E. K. Jarrett, administrator, Corpus Christi, Tex.

[73] Assignee: Clayton Specialties, Inc., Corpus Christie, Tex.

[22] Filed: Nov. 20, 1972

[21] Appl. No.: 308,266

[52] U.S. Cl. ............................................... 198/229
[51] Int. Cl. ............................................ B65g 45/00
[58] Field of Search ........ 198/229, 230; 74/230, 57, 74/58

[56] References Cited
UNITED STATES PATENTS
2,676,352  4/1954  Moore ................................ 74/57 X
3,206,011  9/1965  Hill et al. ............................ 198/230

FOREIGN PATENTS OR APPLICATIONS
51,673  8/1966  Poland ................................. 198/229

Primary Examiner—James B. Marbert
Assistant Examiner—Douglas D. Watts
Attorney, Agent, or Firm—Stewart N. Rice

[57] ABSTRACT

A method and apparatus for cleaning the cylindrical rods of an endless rod conveyor wherein said flight rods are caused to engage and drive a spur gear in the manner of a pinion and a rack, the spur gear being mounted on a fixed-position level wind shaft which is parallel to the flight rods. Rotation of the spur gear by the flight rods also causes the gear to simultaneously reciprocate back and forth along the level wind shaft and therefore provide a wiping motion to a small portion along each flight rod upon each engagement of such with the spur gear.

15 Claims, 10 Drawing Figures

3,841,469

METHOD AND APPARATUS FOR CLEANING ROD CONVEYORS

BACKGROUND OF THE INVENTION

The present invention relates to a method and apparatus for cleaning the flight rods of an endless rod conveyor.

Endless rod conveyors wherein a transporting surface is formed by a series of uniformly spaced, parallel cylindrical flight rods suspended between parallel endless chains are well known. Movement of the chains thus causes the flight rods to move in a direction transverse of the flight rods and provides a moving surface for transportation of articles. In many uses to which such endless rod conveyors are put, the flight rods acquire a film of dirt, grease or other substances due to the conditions under which the conveyors operate. Depending of course on the use to which the conveyor is put, accumulation of such a film may necessitate a time-consuming shut down and cleaning operation for sanitary or other reasons. This is particularly true in the baking industry where such endless rod conveyors are frequently used to transport unpackaged bread loaves or other bakery products during cooling or packaging operations. For example such use of endless rod conveyors to transport unpackaged bakery products is disclosed in U.S. Pat. No. 3,433,375 to D. A. Jones, U.S. Pat. No. 2,827,152 to R. H. Kampfer and U.S. Pat. No. 2,247,675 to W. A. Thum. In view of the time and expense of shutting down a conveyor and cleaning each rod it has been desirable to have a method and apparatus to continuously effect the cleaning of the flight rods of an endless conveyor during its operation as a transportation means. Heretofore no suitable method or apparatus for accomplishing such has been brought forth.

SUMMARY OF THE INVENTION

It is thus an object of the present invention to provide a method and apparatus for cleaning the cylindrical flight rods of an endless rod conveyor while such is in use as a conveyor. It is a particular object of the present invention to provide a method and apparatus for cleaning the cylindrical flight rods of an endless rod conveyor which is used in transporting unpackaged bakery products.

The foregoing and other objects are accomplished by the present invention which in one of its aspects is a method for cleaning the hereafter defined cylindrical portions of the flight rods of an endless rod conveyor having a transporting surface formed by a plurality of flight rods at least a portion of each of which is a straight, cylindrical portion suspended transversely of and between endless chain means which are parallel one to the other, the cylindrical portions of the flight rods being parallel and uniformly spaced one from another, said endless rod conveyor having driving means for causing movement of said flight rods in a direction transverse of the cylindrical portions thereof, which cleaning method comprises engaging the cylindrical portions of said flight rods with teeth of at least one spur gear which is rotatably and co-axially mounted on the threaded portion of a fixed-position non-rotatable level wind shaft, and which spur gear is associated with a pawl inserted into the threads of said threaded portion such that rotation of said spur gear causes said spur gear to reciprocate back and forth along said level wind shaft, said level wind shaft being parallel to the cylindrical portions of said flight rods such that the cylindrical portions of said flight rods and said spur gear act, respectively, in the manner of a rack and pinion whereby movement of said flight rods drives and rotates said spur gear, said threaded portion of said level wind shaft being of a length and being mounted with respect to the cylindrical portion of a flight rod with which said spur gear is engaged such that the outer limits of the distance along which said spur gear reciprocates is equal to the length to be cleaned along such cylindrical portion of such flight rod. In another aspect the present invention comprises an apparatus for effecting the foregoing method for cleaning the cylindrical portion of the flight rods of an endless rod conveyor.

BRIEF DESCRIPTION OF THE FIGURES

In all of the figures, the same numbers are used to denote like elements.

DETAILED DESCRIPTION OF THE INVENTION

Figure 1:
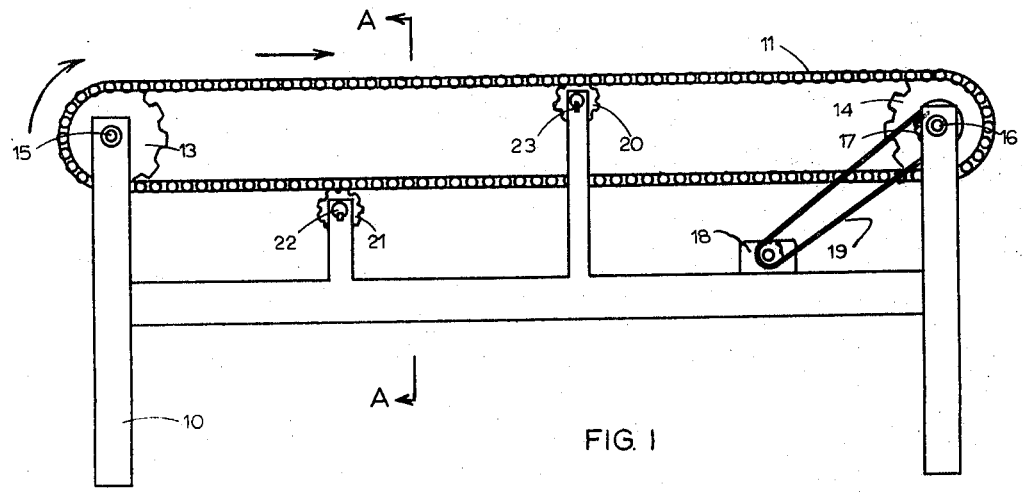
FIG. 1 is a side elevation view of an endless rod conveyor having cleaning apparatus associated therewith and in accordance with the present invention.
Figure 2:
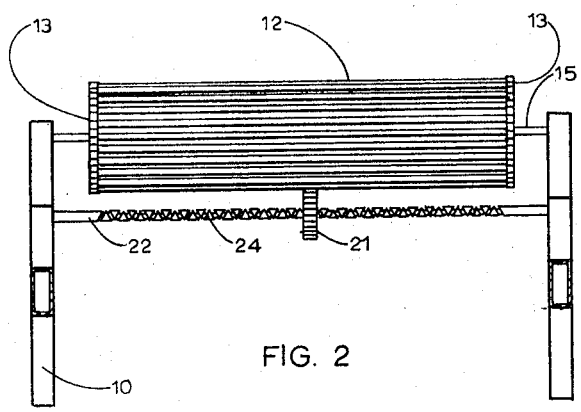
FIG. 2 is a sectional view of the endless rod conveyor of FIG. 1 along lines A—A.

Referring to FIGS. 1 and 2, there is there illustrated an endless rod conveyor adapted for transporting articles from left to right as viewed in FIG. 1, which endless rod conveyor includes frame 10 and parallel endless chains 11 spanned by uniformly spaced apart cylindrical flight rods 12 which are parallel one to the other. Endless chains 11 are trained over and engaged by transversely spaced apart idler sprockets 13 at the rear end of the conveyor and transversely spaced apart drive sprockets 14 at the front end of the conveyor. Idler sprockets 13 are fixedly mounted on a shaft 15 and drive sprockets 14 are fixedly mounted on a shaft 16. Both shafts 15 and 16 are journaled at each of their ends in bearings mounted in frame 10 such that such shafts may rotate freely. There is also fixedly mounted on shaft 16 a drive sprocket 17 which is driven by a suitable motor 18 through means of chain 19. Motor 18 causes drive sprocket 17 to turn in a clockwise manner which in turn cause sprockets 13 and 14 as well as endless chains 11 to also revolve in a clockwise manner. The flight rods 12 are thus caused to move in a direction transverse of the axes of such flight rods, the upper layer of flight rods in FIG. 1 moving from left to right and the lower layer moving from right to left as indicated by the arrows.

In accordance with the present invention there is provided in combination with the endless conveyor of FIGS. 1 and 2 a spur gear 20 and a spur gear 21. The circular pitch of the teeth on both spur gears 20 and 21 is the same as the distance between the axes of adjacent flight rods 12. Spur gear 21 is rotatably and co-axially mounted on level wind shaft 22 and spur gear 20 is rotatably and co-axially mounted on level wind shaft 23, both of which shafts 22 and 23 are parallel to flight rods 12. Both level wind shafts 22 and 23 are journaled at each of their ends in frame 10 and rotation of such shafts about their respective axes is prevented by means of a slot and key. Both level wind shafts 22 and 23 have left and right hand threads 24 with the threaded portion corresponding substantially in length to the length of flight rods 12. Although not illustrated, level wind shaft 23 and spur gear 20 are identical to level wind shaft 22 and spur gear 21.

Figure 3:
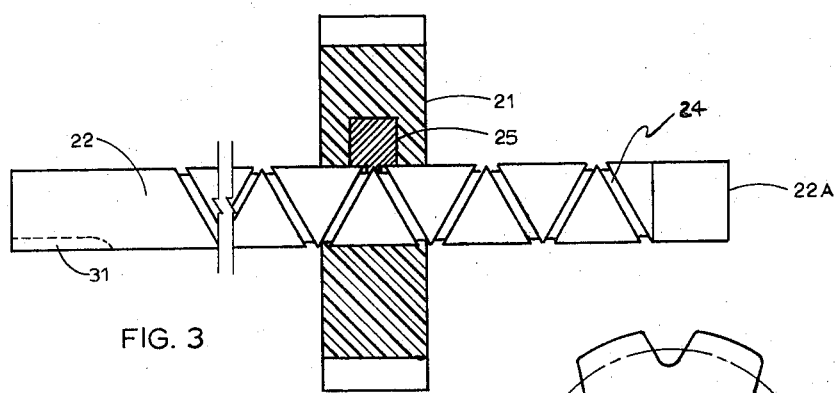
FIG. 3 is a view of a level wind shaft and a sectional view of a spur gear and pawl mounted thereon.
Figure 4:
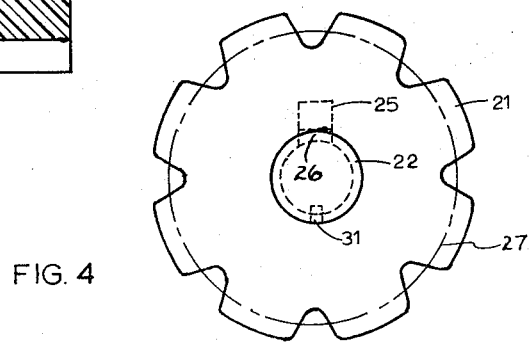
FIG. 4 is an end view of the level wind shaft and spur gear of FIG. 3 with the spur gear being shown in full.

Referring to FIGS. 3 and 4 for a more detailed view, level wind shaft 22 is a cylindrical shaft having a threaded portion which has a left and right hand square flank thread form connected at each end of the threaded portion. Such threads could be other than of the square flank form but it has been found that such form is preferable. Spur gear 21 has within a recess therein a freely rotatable pawl 25 the tongue 26 of which extends into threads 24. One end of shaft 22 has a removable end section 22-A which can be removed so as to insert the pawl into the threads and then the end section 22-A replaced. Since level wind shaft 22 is not rotatable because of slot 31 in which a key is normally inserted, and since pawl 25 is freely rotatable about lines perpendicular to the axis of level wind shaft 22, rotation of spur gear 21 will cause tongue 26 to track threads 24 and result in the reciprocation of spur gear 21 back and forth along the level wind shaft. The distance along shaft 22 which spur gear 21 reciprocates is of course limited and determined by the length of the threaded portion.

Figure 5:
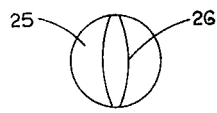
FIGS. 5, 6 and 7 are, respectively, top, front, and side views of a pawl.
Figure 6:
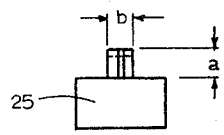
Figure 7:
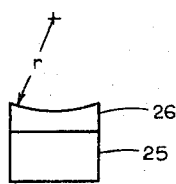

A more detailed view of pawl 25 is shown in FIGS. 5, 6 and 7. As can be seen from such Figures, pawl 25 has a cylindrical base portion which extends into and rotates freely within a recess in spur gear 21. The tongue 26 extends above the base portion a distance corresponding to the depth of the threads in the level wind shaft, distance $a$ corresponding to the depth of such threads. The end of tongue 26 is concave, the radius of curvature $r$ corresponding to the radius of the bottom of the threads 24 on level wind shaft 22. Referring to FIG. 5, the tongue is slightly tapered on each side so as to permit easier tracking of the thread the widest portion $b$ corresponding to the thread width.

Figure 8:
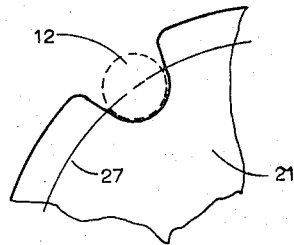
FIG. 8 is a fragmentary view of a spur gear showing tooth detail.

For best cleaning performance each tooth space of the spur gear should have a profile such that the flank of each tooth will have good contact with the surface of the flight rods. A preferred form of tooth is illustrated in FIGS. 4 and 8 wherein the spur gear and teeth thereon are illustrated in more detail. As may be seen from the drawings, FIG. 8 particularly, as the tooth spaces of a spur gear 21 successively engage each of the cylindrical portions of flight rods 12, during each such engagement the tooth space partially closely surrounds a section of the cylindrical portion of the flight rod (the length of the section so partially surrounded being equal to the thickness of the spur gear). As may be further seen from the drawings, the teeth and tooth spaces of spur gears are of such a nature that when a spur gear engages the flight rods of a conveyor in the manner of a rack and pinion, then the tooth adjacent a tooth space which is an actual engagement with a section of the cylindrical portion of a flight rod will substantially fill the gap between the corresponding section of an adjacent flight rod. As pointed out before, the circular pitch of the tooth space which will engage the flight rods, that is the distance between the center of one tooth space (groove) and the center of the adjacent tooth space (groove) as measured along pitch line 27, must be equal to the distance between axes of adjacent flight rods. The profile of each tooth space is preferably such that the depth of the tooth space is substantially equal to the diameter of the flight rods 12, and such that the profile of the portion of the tooth space below pitch circle 27 is substantially a semi-circle the diameter of which semi-circle is at least as large as the outside diameter of the flight rods 12, and preferably corresponding to such outside diameter. Good results may however be obtained even when the diameter of the semi-circular portion of the lower half of the tooth space is slightly larger than the outside diameter of flight rods 12 although it is recommended that such be within the range of 1.0 to 1.3 times the outside diameter of the flight rods.

The configuration of a preferred form of tooth space of a spur gear is more clearly illustrated in FIG. 8, such also illustrating a flight rod 12 (in dashed lines) in contact with a tooth space on spur gear 21. As can be seen, there is no clearance between flight rod 12 and the bottom of the tooth space. Elimination of any clearance between flight rod 12 and the flank of a tooth space will give better surface contact between the spur gear and the flight rod and result in a better cleaning action.

Referring again to FIGS. 1 and 2, level wind shafts 22 and 23 are spaced between the plane of the flight rods by a distance sufficient to cause each flight rod to engage spur gears 20 and 21 as the flight rods pass adjacent to the level wind shafts. In order to give the type of contact shown in FIG. 8 between a flight rod and a spur gear, the axis of the level wind shaft on which the spur gear is mounted should be separated from a plane containing the axis of the flight rods with which such spur gear is to engage by a distance equal to the diameter of the pitch circle of the spur gear. Each of the spur gears engages the flight rods in the manner of a rack and pinion with the movement of the flight rods causing rotation of the spur gears. Due to the fact that rotation of each of spur gears 20 and 21 also causes them to reciprocate back and forth along level wind shafts 23 and 22, while a particular flight rod is engaged and in contact with the tooth space of a spur gear such spur gear will also be moving axially along the surface of the flight rod so as to provide a wiping motion to a small portion of such flight rod. As the endless conveyor continuously operates over a long period of time, the entire surface of each flight rod will eventually be wiped and kept clean by the spur gears.

In the apparatus shown in FIGS. 1 and 2 there are two spur gears utilized, one spur gear 20 being within the loop formed by endless chains 11 and flight rods 12 and the other spur gear 21 being located outside such loop. Although more spur gears may be utilized if desired for a faster cleaning action, where the flight rods are not free to rotate about their respective axes it is necessary to have at least one spur gear inside the loop formed by the endless chains and flight rods and at least one spur gear outside such loop in order to clean the entire surface of the flight rods. Thus in FIG. 1, if flight rods 12 are not free to rotate about their axis then spur gear 20 will only clean that portion of the surface of each flight rod which faces inwardly of the loop while spur gear 21 will only clean that portion of the surface of each flight rod which faces outwardly of the loop, such latter portion being the portion of the flight rods which would actually come in contact with the articles being transported by the endless conveyor. On the contrary if flight rods 12 of FIG. 1 were free to rotate about their axes, either spur gear 20 or spur gear 21 would eventually wipe the entire surface of each flight rod and thus only one spur gear would actually be necessary in such a situation.

Figure 9:
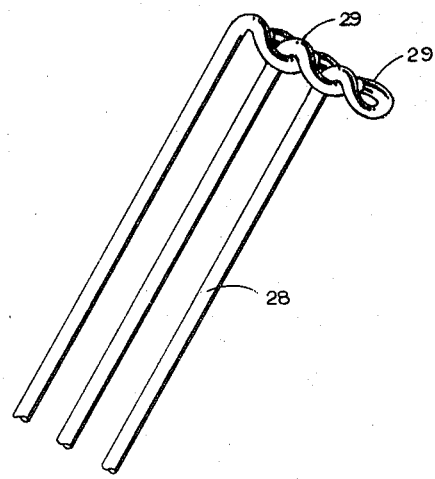
FIG. 9 is a perspective view showing a short section of a type of flight rods.

The present invention is not to be limited to the particular embodiments illustrated in FIGS. 1 through 8 since the present invention is applicable to many types of conveyors, flight rods, level wind shafts, pawls, spur gears and the like. Thus for example the present invention is applicable to the cleaning of flight rods, or at least the cylindrical portions thereof, where such flight rods are not entirely cylindrical in nature. For example the type of flight rods illustrated in FIG. 9 are frequently used in endless rod conveyors for transporting unpackaged bakery products. As can be seen such type of flight rods have a straight cylindrical portion 28 with each end of the flight rods (only one end being illustrated) being bent in angular relation and formed into loops 29, each of which encircles the next adjoining flight bar. The loops 29 are offset with respect to the straight cylindrical portion 28 as illustrated so as to encircle the next adjoining flight rod closely adjacent to the points of bend. The loops are so arranged as to hold the straight portions 28 parallel but to allow desired angularity between the flight rods about the axis of the straight portions 28. Accordingly the spaced apart straight, cylindrical portions may straddle the teeth of spaced apart supporting sprockets at each end of the conveyor. Thus on a conveyor utilizing the type of flight rods illustrated in FIG. 9, the straight portion 28 of the flight rod would form the transporting surface while the endless chain means between which such straight portions were suspended would be the inter-connected loops 29. In many instances where an endless conveyor contains a type of flight rods illustrated in FIG. 9, as well as when other type rods are used, the inter-connecting loops or chain means will travel over and be supported by some type of flat support means between the front and rear sprockets so as to prevent sagging. Also in some conveyors the straight cylindrical portions of flight rods may slide over a support surface during a portion of the cycle.

The spur gears useful in the present invention are most preferably designed with a tooth profile as described above. Many other tooth profiles could be utilized although they might not be as efficient. The spur gear itself can be made of various materials including metal, wood, synthetic plastic and the like. In order to give a better cleaning action the face and flank surfaces of each tooth space may be embedded with an abrasive material. The spur gears used for cleaning should generally have at least six teeth to accomplish a smooth rotating action and preferably contain at least nine teeth.

In order to avoid excessive wear of the flight rods being cleaned, the spur gears are preferably formed of a material which is softer than such flight rods. In cleaning metal flight rods it has been found that a spur gear formed of a hard synthetic resin material gives best results.

The level wind shafts useful in the present invention are constructed according to well known techniques. The speed and distance which the spur gear moves along a flight rod at each engagement will depend on the pitch of the threads of the level wind shaft and the number of teeth on the spur gear. Generally the pitch of the threads and the number of teeth on the spur gear should be such that the spur gear will reciprocate along the level wind shaft a distance of about 0.25 to 2.0 times the diameter of the cylindrical portion of the flight rod being cleaned, preferably from 0.75 to 1.25 times such diameter, during each engagement of the spur gear with a particular flight rod. The length of the threaded portion of the level wind shaft will be determinative of the distance through which the spur gear reciprocates and thus determinative of the length along the flight rods which will be cleaned. Since the pawl will generally be located in the middle of the thickness of the spur gear, the outer limits of the distance traveled by the spur gear will be slightly greater than the length of the threaded portion of the level wind shaft. Therefore in designing a level wind shaft and spur gear it should be kept in mind that (at least for the type system shown in FIGS. 3 and 4) the distance through which the spur gear reciprocates will be about the length of the threaded portion of the level wind shaft plus the width of the spur gear less one thread width (that is the thickness $b$ of the pawl).

The pawl which tracks the threads of the level wind shaft does not have to be a part of and inserted into the spur gear itself. If desired the pawl can be a part of a hub means which reciprocates back and forth along the level wind shaft, with the spur gear being mounted on the hub. Other variations will be apparent to those skilled in the art.

Figure 10:
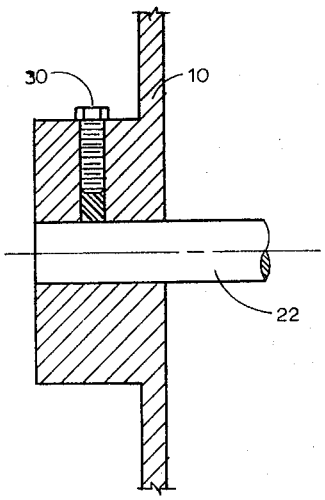
FIG. 10 is a sectional view of a level wind shaft journaled in a supporting frame.

Due to various reasons, the cylindrical portion of a flight rod of a conveyer might become bent. If such occurs then the spur gear cleaning apparatus of the present invention might cause damage to the conveyor when the spur gear encounters the bent flight rod unless a release means or mechanism is provided which will serve to prevent the spur gear from reciprocating along the level wind shaft while continuing to rotate about the axis of the level wind shaft. The reason the damage to the conveyor may occur is that the spur gear can only reciprocate along a straight line (that is along the axis of the level wind shaft) and therefore if a bent flight rod is engaged by the spur gear then the spur gear will, if it continues to reciprocate along the level wind shaft, exert force on the bent flight rod which will tend to straighten it. However, the usual flight rod is of sufficient strength to prevent such a straightening by the spur gear and instead the flight rod will jam or hang in the spur gear, or tear loose from the drive chains, or both, and result in damage to the conveyor. Various kinds of release means may be utilized whereby an excessive force resisting the reciprocation of the spur gear along the level wind shaft will result in the spur gear's not reciprocating while it does continue to rotate about the axis of the level wind shaft. Prevention of reciprocation of the spur gear is accomplished by preventing the pawl associated with the spur gear from tracking the threads of the level wind shaft. This can specifically be accomplished by providing a release means in the mounting of the level wind shaft and the frame such that the level wind shaft will rotate about its axis if excessive force is exerted thereon. As can be seen, if the level wind shaft rotates in the same manner that the spur gear rotates then no reciprocation of the spur gear along the level wind shaft will occur. Reference to FIG. 10 is made for specific embodiment of a means to mount level wind shaft 22 and supporting frame 10 such that level wind shaft 22 does not rotate under normal conditions but can rotate when excessive rotative force is placed on the shaft. As can be seen the end of level wind shaft 22 is journaled in frame 10 and is prevented from rotating about its axis by means of a bolt 30 extending through a threaded hole in frame 10 into contact with level wind shaft 22. The tip or end of bolt 30 which contacts and holds level wind shaft 22 is made of rubber or other resilient material and thus when excessive rotative force is applied to the level wind shaft 22 then the rubber tip of bolt 30 will slip and allow rotation of the shaft.

When the pawl is not located within a recess in the spur gear itself but is located within a hub on which the spur gear is mounted, then reciprocation of the spur gear can be prevented even though the spur gear continues to rotate by providing a release means whereby the spur gear can slip or rotate with respect to the hub on which it is mounted. In other words when excessively large forces are placed on the spur gear by a bent flight rod, the spur gear will slip or rotate with respect to the hub and thus will not cause the hub to reciprocate along the level wind shaft. Many friction devices, such as a rubber tipped bolt, will be apparent to allow a spur gear to slip or rotate with respect to a hub which it is mounted. In an apparatus where the spur gear is mounted on a hub, both types of release mechanisms are preferably provided. That is a release mechanism of the type which will allow the level wind shaft to rotate with respect to the mounting and a release mechanism which will allow the spur gear to slip with respect to the hub. Regardless of the means to accomplish it, there is preferably present release means actuated by abnormally excessive forces resisting reciprocation of the spur gear which prevents reciprocation of said spur gear while the spur gear continues to rotate.

What is claimed is:

1. A method for cleaning the hereafter defined cylindrical portions of the flight rods of an endless rod conveyor having a transporting surface formed by a plurality of flight rods at least a portion of each of which is a straight, cylindrical portion suspended transversely of and between endless chain means which are parallel one to the other, the cylindrical portions of the flight rods being parallel and uniformly spaced one from another, said endless rod conveyor having driving means for causing movement of said flight rods in a direction transverse of the said cylindrical portions thereof, which cleaning method comprises successively and continuously engaging each of said cylindrical portions of said flight rods with the tooth spaces of at least one spur gear which is rotated and driven by said cylindrical portions in the manner of a rack and pinion, and which spur gear, while being so rotated, during each engagement with the cylindrical portion of a particular flight rod also simultaneously moves axially with respect to the said cylindrical portion of said particular flight rod a distance of 0.25 to 2.0 times the diameter of said cylindrical portion, such that each of said tooth spaces while engaged with a particular one of said flight rods provides a wiping motion to a portion of the surface of the straight, cylindrical portion of such flight rod.

2. The method of claim 1 wherein the distance between the centers of said tooth spaces as measured along the pitch circle of said spur gear is equal to the distance between axes of the cylindrical portions of said flight rods.

3. The method of claim 1 wherein said spur gear is formed of material softer than said flight rods.

4. The method of claim 1 wherein the profile of each tooth space on said spur gear from the pitch circle to the bottom of the tooth space is substantially a semi-circle the diameter of which semi-circle is at least as large and generally corresponds to the outside diameter of the cylindrical portions of said flight rods.

5. In combination (a) an endless rod conveyor having a transporting surface formed by a plurality of flight rods at least a portion of each of which is a straight, cylindrical portion suspended transversely of and between endless chain means which are parallel one to the other, the cylindrical portions of the flight rods being parallel and uniformly spaced one from another, said endless rod conveyor having driving means for causing movement of said flight rods in a direction transverse of the said cylindrical portions thereof, and (b) at least one spur gear the tooth spaces of which successively engage and partially closely surround a section of each of the said cylindrical portions of said flight rods as they pass adjacent thereto in the manner of a rack and pinion, the gap between a said section of a said cylindrical portion of a flight rod which is in actual engagement with said spur gear and a corresponding section of the cylindrical portion of an adjacent flight rod being substantially filled by a tooth of said spur gear, which said spur gear is rotated and driven by said cylindrical portions of said flight rods, and means to cause said spur gear, while remaining engaged with the flight rods passing adjacent thereto and being so rotated, to also simultaneously move axially with respect to said cylindrical portions of said flight rods so as to provide a wiping of a portion of the surfaces thereof.

6. The apparatus of claim 5 wherein said spur gear is rotatably and co-axially mounted on the threaded portion of a fixed-position non-rotatable level wind shaft, and which spur gear is associated with a pawl inserted into the threads of said threaded portion such that rotation of said spur gear causes said spur gear to reciprocate back and forth along the said level wind shaft, said level wind shaft being parallel to said cylindrical portions of said flight rods such that said cylindrical portions of said flight rods and said spur gear act, respectively, in the manner of a rack and pinion whereby movement of said flight rods drives and rotates said spur gear, said threaded portion of said level wind shaft being of a length and being mounted with respect to the cylindrical portion of a flight rod with which said spur gear is engaged such that the outer limits of the distance along which said spur gear may reciprocate is equal to the length to be cleaned along such cylindrical portion of such flight rod.

7. The apparatus of claim 6 wherein the distance between the centers of said tooth spaces of said spur gear as measured along the pitch circle of said spur gear is equal to the distance between axes of the said cylindrical portions of said flight rods.

8. The apparatus of claim 7 wherein said spur gear is formed of material softer than flight rods.

9. The apparatus of claim 6 wherein the profile of each tooth space on said spur gear from the pitch circle to the bottom of the tooth space is substantially a semi-circle the diameter of which semi-circle is at least as large as and generally corresponds to the outside diameter of the cylindrical portions of said flight rods, said level wind shaft being mounted with respect to said cylindrical portions of said flight rods such that upon maximum engagement of a cylindrical portion of a flight rod and a tooth space there is no clearance between the bottom of said tooth space and such cylindrical portion.

10. The apparatus of claim 6 wherein during each engagement with a particular flight rod said spur gear moves axially along said level wind shaft a distance which is from about 0.75 to 1.25 times the diameter of such particular flight rod.

11. The apparatus of claim 10 wherein there is a release means actuated by abnormally excessive forces resisting reciprocation of said spur gear which prevents reciprocation of said spur gear while said spur gear continues to rotate.

12. The apparatus of claim 5 wherein during each engagement with a particular flight rod, said spur gear moves axially a distance which is from about 0.25 to 2.0 times the diameter of such particular flight rod.

13. The apparatus of claim 12 wherein said spur gear contains at least six teeth.

14. The apparatus of claim 13 wherein said spur gear is rotatably and co-axially mounted on the threaded portion of a fixed-position non-rotatable level wind shaft, and which spur gear is associated with a pawl inserted into the threads of said threaded portion such that rotation of said spur gear causes said spur gear to reciprocate back and forth along the said level wind shaft, said level wind shaft being parallel to said cylindrical portions of said flight rods such that said cylindrical portions of said flight rods and said spur gear act, respectively, in the manner of a rack and pinion whereby movement of said flight rods drives and rotates said spur gear, said threaded portion of said level wind shaft being of a length and being mounted with respect to the cylindrical portion of a flight rod with which said spur gear is engaged such that the outer limits of the distance along which said spur gear may reciprocate is equal to the length to be cleaned along such cylindrical portion of such flight rod.

15. The apparatus of claim 5 wherein there is a release means actuated by abnormally excessive forces resisting reciprocation of said spur gear which prevents reciprocation of said spur gear while said spur gear continues to rotate.

* * * * *